(12) United States Patent
Schneeberger et al.

(10) Patent No.: US 6,501,262 B1
(45) Date of Patent: Dec. 31, 2002

(54) METHOD FOR APPLYING AND CORRECTING MEASURING MARKS ON A CARRIER

(75) Inventors: Hans-Martin Schneeberger, Langenthal (CH); Frederic L. Way, Lotzwil (CH)

(73) Assignee: Schneeberger Holding AG, Roggwil (CH)

( * ) Notice: Subject to any disclaimer, the term of this patent is extended or adjusted under 35 U.S.C. 154(b) by 0 days.

(21) Appl. No.: 09/451,703

(22) Filed: Dec. 1, 1999

(30) Foreign Application Priority Data

Dec. 3, 1998 (CH) ................................................ 2404/98

(51) Int. Cl.$^7$ ........................... G01B 7/00; G01B 7/04; G01B 11/02

(52) U.S. Cl. ................. 324/206; 324/202; 324/207.12; 324/225; 33/DIG. 1; 33/DIG. 4; 33/DIG. 21; 33/706; 33/708; 73/1.79; 702/94

(58) Field of Search ................................ 324/202, 206, 324/207.12, 207.24, 225; 33/DIG. 1, DIG. 4, DIG. 21, 702, 706, 708, 716, 751; 29/593; 361/143, 147, 148; 73/1.79, 1.81; 702/94, 97; 346/139 R

(56) References Cited

U.S. PATENT DOCUMENTS 4,490,914 A   1/1985   Spies
4,932,131 A   6/1990   McMurtry et al.
5,949,685 A * 9/1999   Greenwood et al. ........ 700/193

FOREIGN PATENT DOCUMENTS

EP   0 395 374   10/1990

* cited by examiner

Primary Examiner—Gerard R. Strecker
(74) Attorney, Agent, or Firm—Venable; Thomas G. Wiseman

(57) ABSTRACT

The invention relates to a method for applying to a carrier a marking serving to measure length, angle cr the like, such as, for example, a magnetic tape (4), by means of which the accuracy of the measurements is improved. In the case of such methods, in one marking step a means for producing a track with markings, for example a writing head (9), is guided over the carrier and, by virtue of the fact that the carrier is acted upon, markings, for example magnetic north and south poles, are applied therein at predetermined positions of the carrier. According to the invention, it is proposed that in this method the actual positions of a reference point (16), the difference between the the marking of the track are measured with respect to measured actual positions and desired positions are determined, and, when differences are present, corrected marking are applied to the same track of the carrier in a further marking step, positions of markings of the first marking step being changed with respect to positions of markings of the second marking step by values depending on the differences.

17 Claims, 3 Drawing Sheets

METHOD FOR APPLYING AND CORRECTING MEASURING MARKS ON A CARRIER

BACKGROUND OF THE INVENTION

1. Field of the Invention

The invention relates to a method for applying to a carrier a marking serving to measure length, angle or the like, in which in one marking step a means for producing a track with markings is guided over the carrier and, by virtue of the fact that the carrier is acted upon, permanent markings are applied therein at predetermined positions of the carrier.

2. Description of Related Art

In many fields of technology, it is necessary to determine positions of machines, machine components etc. A multiplicity of measuring methods have already become known for this purpose. A first example in this respect is the measuring method using transmitted light or reflection with the aid of glass scales which have alternating bright/dark markings. A further example is magnetic measuring methods with north and south poles applied in an alternating fashion to a carrier. Finally, measuring methods have also become known in which the "markings" are scanned inductively. This enumeration of measuring methods for which the present invention is suitable is only exemplary and not final.

Common to all these measuring methods is that they use markings which have different physical properties. These differences are detected by suitable sensors. Since the length of each individual marking is known in advance, the desired measurement of length or angle can be carried out by means of the number of the detected "changes in property".

A substantial source of error in all these measuring methods consists, however, in that the individual markings do not have the desired properties. For example, a length measurement is not exact whenever one of the marking is located at a position other than that provided, or its length does not correspond to the prescribed length.

BRIEF SUMMARY OF THE INVENTION

It is therefore the object of the present invention to create a method and a device with the aid of which the measuring accuracy of such measuring methods can be improved.

According to the invention, this object is achieved in the case of a method named at the beginning by virtue of the fact that actual positions of the markings of the track are measured with respect to a reference point, the differences between measured actual positions and desired positions are determined and, when differences are present, corrected markings are applied to the same track of the carrier in a further marking step, positions of the markings of the first marking system being offset with respect to positions of markings of the second marking step by values depending on the differences.

The object is also achieved by means of the system shown in FIG. 1. This system includes a marking device (8) for writing a multiple markings track, a clamping device (2) for positioning a carrier within the system and a positioning device with causes relative movement between the carrier and the writing element (9), a measuring device (10) which determines the actual positions or specific points of the markings, means for storing the measured actual positions, means for 1) comparing the actual positions or specific points of the markings with prescribed desired positions of the markings or specific points and 2) determining the deviation between the actual and desired positions, and a controller for controlling the application of the markings to the carrier a new. The positions of these further markings are corrected in each case by a value which depends on the previously determined deviations.

Thus, according to the invention a compensation of positioning errors of the markings is carried out. The accuracy of such measuring methods can be increased by correcting the positions or the length or other physical properties of markings already produced in at least one further marking step. It is decisive for the accuracy of the measuring method that, for example, transitions from a magnetic north pole to a following south pole or vice versa, or transitions of other property changes are now located at the prescribed positions. The result of this is a constant length of the poles or markings, which correspond to the respectively provided incremental division.

In the case of a measuring method which uses a track like the markings produced using the method according to the invention, it is usual to proceed from a reference point and to count only the number of the changes in property. Consideration may be given as changes in property to, for example, the change in the direction of the magnetic field strength or magnetic field induction, and thus to the change from one pole to another pole. By multiplying by the size of the incremental division, the position or the positioning path of the measuring device can be determined more accurately. Since the accuracy of the positioning of the transitions from one marking of the track to the following marking is thereby completely decisive for the accuracy of the measuring method itself, it is preferred according to the invention that in the case of the production of the track, as well, it is chiefly the deviations of the transitions from their desired positions which are corrected.

This method for applying markings constitutes a break with the previously applied direction of development for the purpose of improving the measuring accuracy. To be precise, said direction provided either always attempts to increase the positioning accuracy in the case of a single marking step per track, or to apply a further correction track in addition to the measuring track. Moreover,—otherwise than with previous marking methods—this method assumes that essentially only the positions of those changes in property or pole are decisive which are to be observed in the form of a prescribed uniform raster. The poles whose lengths are of only secondary importance and are yielded from the raster are to be arranged in this raster.

So that the second and each further marking step for compensating errors from one or more preceding marking steps can be carried out particularly simply and with the smallest possible outlay, it can be provided that in these marking steps all the previously produced markings of the track are traversed and marked once again. The further marking step carried out recently in this way therefore differs from the preceding marking step only in that a correction is carried out with the aid of the difference between the desired and actual values in the case of those markings for which a deviation is determined between the desired and actual values of the length, positions or other properties.

The marking method according to the invention can be applied both in "analogue" and in "digital" measuring methods. In this connection, "analogue" measuring methods are to be understood as those methods in which the strength or intensity of markings can be changed by repeated marking. An example of this is magnetic measuring methods.

"Digital" measuring methods are to be understood, by contrast, as those methods whose markings permit only two states, specifically marked or not marked. An example of this is the optical measuring methods, already mentioned, based on glass scales. A further example is methods which use markings produced by punchings and in which the measuring principle is based on the determination of material present yes/no.

In conjunction with analogue marking methods, it has proved to be preferable if when carrying out a further marking step the value for compensating the positioning or application error has the absolute value of twice the difference between the value of the desired and the actual positions. The correction direction is in this case always opposite to the determined direction of deviation of the application error. An (arithmetic) mean value which corresponds exactly to the prescribed desired value is therefore set up by the superimposition of the two last marking steps.

In connection with digital marking methods, it is preferred to form and use for compensating application errors a value which correspond to the single difference between the desired value and the measured value of the respective physical variable. Since it is not a superimposition which takes place here, but only an overwriting, and the new position of the corresponding marking corresponds to the actual position produced by the last marking step, the single value of the difference originally present suffices for correcting the deviation.

The method according to the invention and the system according to the invention can be used in principle independently of the later purpose for which the markings are used. Thus, it is possible to produce tracks which are used for relative or for absolute measuring methods. Absolute measuring methods are distinguished usually by the fact that a plurality of tracks are present whose divisions are of different size. Moreover, in the case of absolute measuring methods a length or an angle is measured with reference to a permanently prescribed, and as a rule unchangeable, reference quantity (zero point). The method according to the invention can be applied for each of these tracks of an absolute measuring method. Of course, however, it is necessary to carry out more than one marking step only in the case of those tracks for which application error are determined. If application errors are measured in the case of a plurality of tracks, the further marking steps for each of these tracks can also be carried out simultaneously—just like the first marking and measuring steps.

The method according to the invention can also be used in the case of "quasi-absolute" measuring methods which use a track of spacing-coded reference marks. These are marks which are arranged at different, but specific spacings from one another. Since the spacings of sequential markings are known, the point at which the sensor of the measuring system is located can be determined by traversing two of these markings. The measuring method with spacing-coded reference marks is described, for example, in DE-C 24 16 212.

Likewise, the method can be applied for marking tracks of relative measuring methods. In these measuring methods, it is not spacings referred to a permanently prescribed reference point which are measured, but spacings from an arbitrary first mark to an arbitrary second mark.

BRIEF DESCRIPTION OF THE DRAWINGS

The invention is explained in more detail with the aid of an exemplary embodiment represented diagrammatically in the figures; in the drawing.

Figure 1:
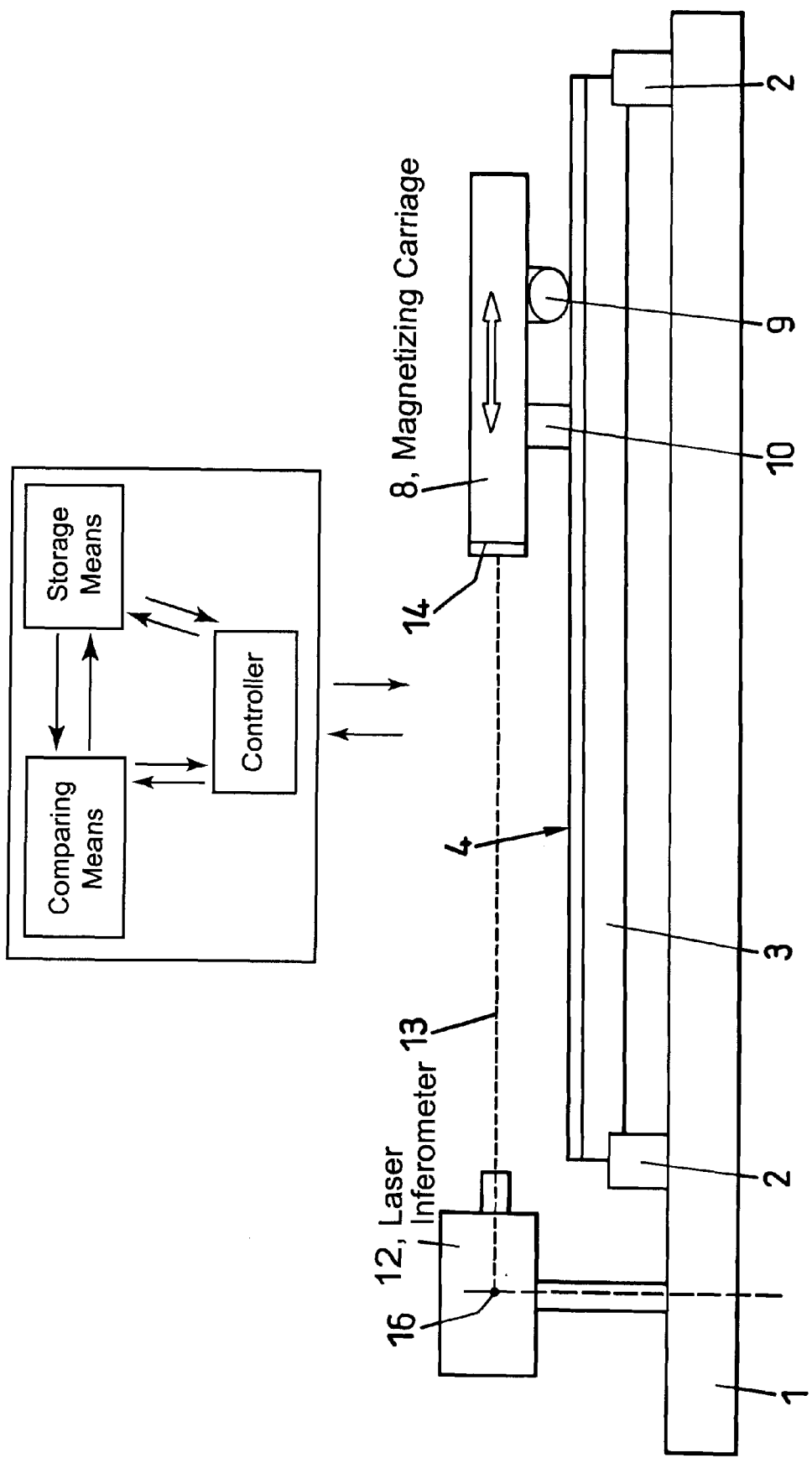
FIG. 1 shows a side view of a magnetizing system according to the invention represented very diagrammatically.

A system with the aid of which the method according to the invention can be carried out is shown in FIG. 1. This system has a frame 1 on which a clamping device 2 is located. Clamped in the clamping device 2 is a rail 3 of a linear motion guide on whose top side a magnetic tape 4 serving as a carrier for markings is fastened. The magnetic tape 4 has a ferromagnetic material into which magnetic markings are to be introduced in the form of north and south poles 5, 6 (FIG. 2a) which are arranged along an incremental track 7 and a reference track (not represented) which runs parallel thereto, which belong to a device for a relative measuring method.

Arranged above the rail 3 is a driven magnetizing carriage 8 which is provided with a magnetic writing head 9 and a magnetic reading head 10. The magnetizing carriage 8 is driven and can be moved parallel to the rail 3. Also arranged on the frame 1, as a component of a measuring device, is a laser interferometer 12 which is aligned approximately in the longitudinal direction of the rail 3 and whose laser beam 13 is directed on to a mirror as reflecting surface on an end face 14 of the magnetizing carriage 8.

Figure 2:
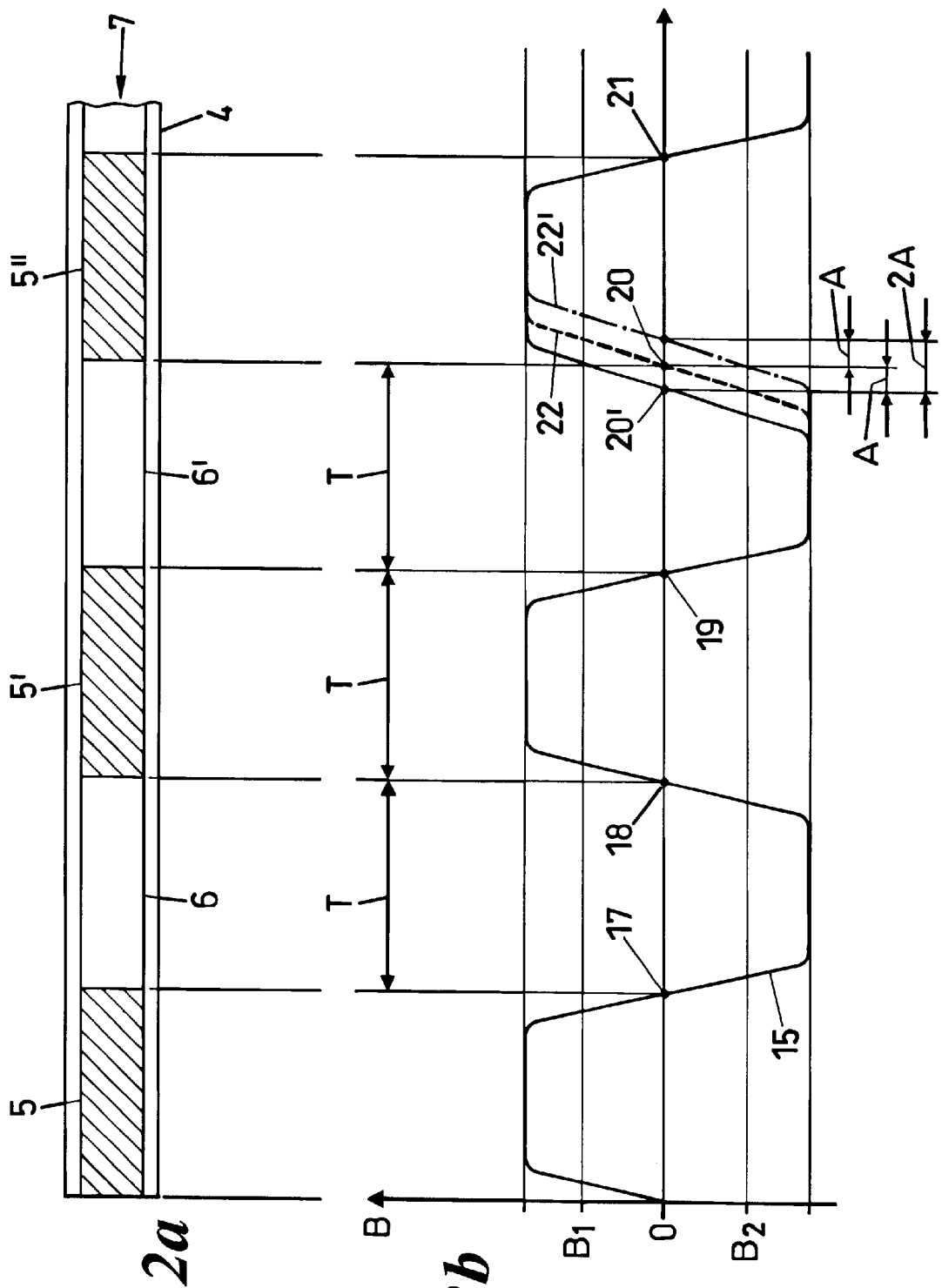
FIG. 2a shows a track of a magnetization.
FIG. 2b shows the characteristic of the magnetization over the length L of a magnetic tape.

The writing head can be used to produce magnetic tracks in a magnetizable material, as shown in FIG. 2a. These are composed of alternately arranged magnetic north poles 6 and south poles 5. In a way similar to a sound head of a cassette recorder, the writing head 9 has a coil (not represented) to which current can be applied in order to generate magnetic induction B. By means of appropriate polarization or reversal of polarity of the coil in the material to be magnetized, it is possible to produce an orientation of the field lines which produce either a north pole or a south pole in the magnetic tape 4.

Consequently, in order to apply a magnetic track 7 the writing head 9 is guided at a constant speed and at a constant spacing over the magnetic tape 4, and the polarity of the coil of the writing head 9 is suddenly reversed at the spacing of the incremental division T, which in the present example is 200 $\mu$m, this reversal then being maintained at a constant current intensity over the length of the incremental division. The current intensity I is dimensional such that magnetic saturation occurs in the material of the magnetic tape 4 in the region of the individual poles 5, 6. In the region of the pole transitions, the magnetization is outside the saturation range. As a result, the magnetic induction B of the track 7 has a characteristic such as is represented by the line 15 in FIG. 2b.

While the markings are being applied, the reducing head 10 arranged downstream of the writing head 9 of the magnetizing carriage in the feed direction of the first marking step is already being used to read the markings produced immediately before. Of course, it is also possible for reading or measuring the track 7 to guide the carriage 8 over the tape once again in a separate measuring step. Positions on the magnetic tape 4 can be determined exactly with reference to a reference point 16 of the laser interferometer 12 together with the positional information obtained by the laser interferometer 12 and the spacing, which is known in the feed direction, between the reflecting surface of the carriage 8 can the reading head 10. However, in principle it is possible to select an arbitrary reference point, because it is not necessarily the absolute position of a marking which is important, but the length which results from the beginning and end of the respective marking.

In this measuring step, the positions are determined for which the induction B detected by the reading head 10 is equal to zero, that is to say the magnetic field strength changes its direction. Such zero crossings 17, 18, 19, 20, 21 correspond to the transition from one magnetic pole to the respective next one. All actual positional data of all the markings are electrically stored in an electronic data processing (EDP) system (not represented) together with the desired positional data already determined before. The desired positional data have already been used to determine the instants of polarity reversal of the coil of the writing head 9 in the marking step previously carried out. Subsequently, the deviations of the measured positions from the desired are determined, and the likewise stored electronically. Of course, it would also be possible in principle on other embodiments of the invention to detect not zero crossings but other values or absolute values of physical variables, and to determine and store them with the aid of these corrected values.

After this method step, the correction pass of the magnetizing carriage begins in the form of a further marking step of the same track. For this purpose, the magnetizing carriage 8 can move over the magnetic tape 4, preferably in the same way, that is to say, in particular at the same constant feed rate and in the same feed direction as in the case of the first marking step. However, it is possible in principle for the magnetizing carriage to move at a different speed, possibly also not a constant one. It is decisive merely that a polarity reversal takes place in each case exactly when the prescribed positioned are reached. In the exemplary embodiment shown, the first three polarity reversals 17, 18, 19 had taken place at the correct instant, for which reason the changes in magnetic field strength are located at the positions provided. The second marking step has therefore not so far differed from the first marking step. However, since in the case of the fourth zero crossing 20 the change deviates from the desired position by a difference A, and the pole is thereby also too short by T-A from the desired length T of the pole, the current is not reversed in polarity until a distance lengthened by 2A. The lengthening of the distance relates to the previous actual position of the zero crossing 20'.

As a result, there is now a superimposition of the magnetizations of the first and of the second marking steps. The magnetization of the track 7 resulting therefrom is reproduced by the curve 22 in FIG. 2b, while the magnetization carried out by the second marking step is represented by the curve 22'. In the representation of FIG. 2b, the curves 22 and 22' are shown only between the saturation regions of the poles 6' and 5". It is to be seen from the three curves 15, 22 and 22' that at the desired position of the zero crossing 20 the addition of the magnetization values of the first and of the second marking steps $B_1$ and $B_2$ yields a resulting magnetic induction of B=0 tesla, since the magnetization values $B_1$ and $B_2$ have the same absolute value but differ from one another in sign. Thus, there is a parallel displacement of the ramp of the magnetization curve, as a result of which the zero crossing now goes through the desired position and the original pole 6' is lengthened by the distance A. By contrast, the pole 5" following the pole 6' is shortened by the distance A. In the same way, all the further deviations of the actual positions from the desired positions of the zero crossings of the magnetizations (pole boundaries) are corrected in this second marking step in the same way.

After termination of the second marking step, it is checked in a second measuring step whether all the positions of the zero crossings are located at the predetermined positions in the resulting track. If deviations are determined again, it is possible to attempt in a further marking step to eliminate this difference as well. Further measuring and marking steps can follow until all the deviations correspond to the prescribed tolerances.

Figure 3:
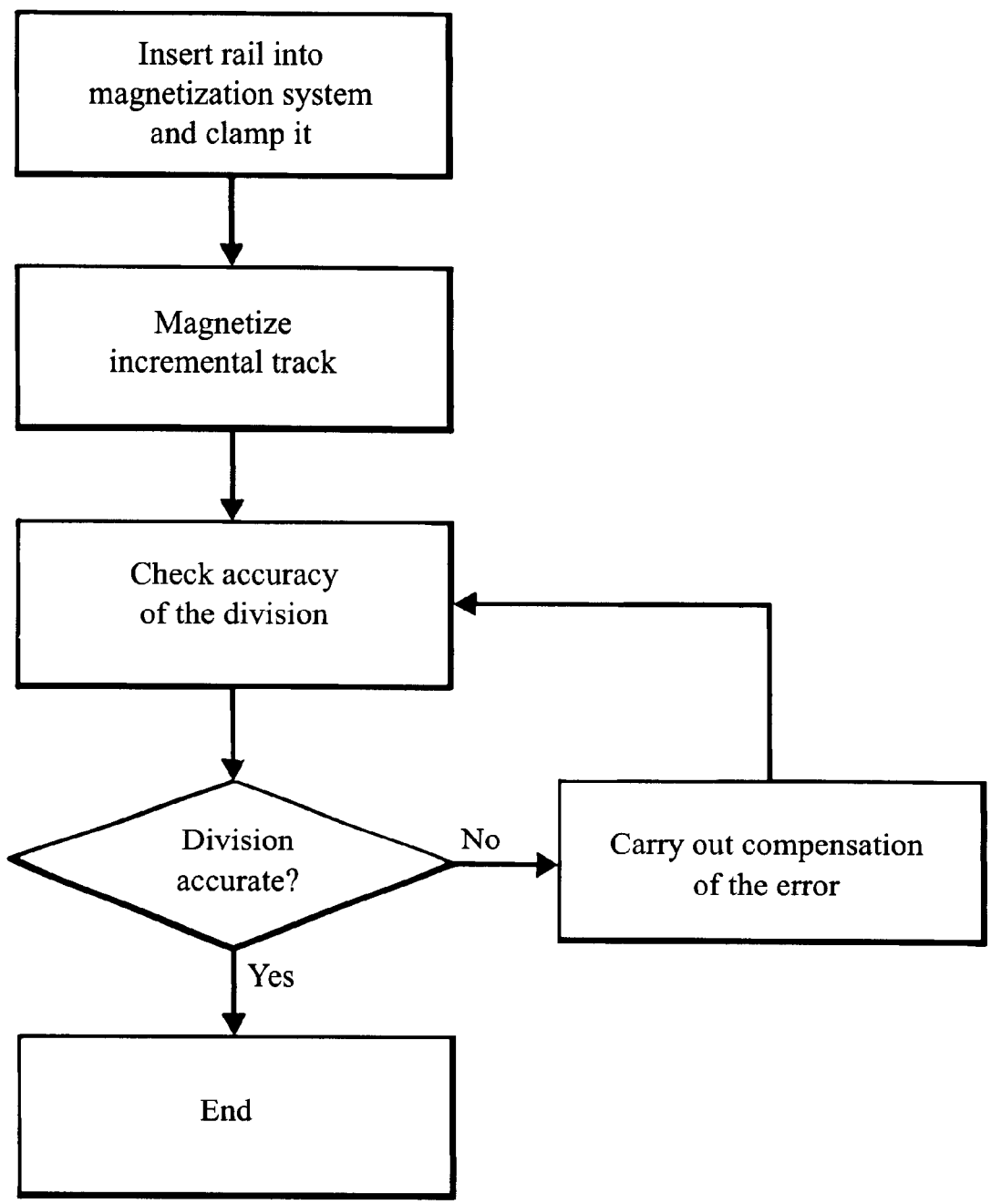
FIG. 3 shows a flowchart of the marking method according to the invention.

The marking method according to the invention for marking an incremental track on a rail of a linear motion guide is represented diagrammatically in the form of a flowchart in FIG. 3.

We claim:

1. A method for applying to a carrier a marking or a series of markings, relating to a length, angle of similar measure, comprising
   A) producing a track with markings at predetermined positions by guiding a marking means over the carrier,
   B) measuring actual positions of markings on the track with respect to a reference point,
   C) determining differences between the measured actual positions and desired positions, and
   D) applying corrected markings to the same track on the carrier in an additional marking step, when differences are present, by changing positions of the markings of the marking step A) or a subsequent corrective marking step with respect to positions of markings of the marking step of step D) by values depending on the determined differences, wherein steps B)–D) can be repeated as needed.

2. The method according to claim 1 wherein the actual positions are sequentially measured from one marking to the respective following marking and the differences determined relative to the respective desired positions by changes which exhibit a difference between the actual and the desired values.

3. The method according to claim 1 wherein in step D) an additional marking is superimposed on the marking of step A).

4. The method according to claim 1 wherein in step D) the value by which markings of marking step D) are offset with respect to markings of step A) corresponds to double the difference between the actual and desired values.

5. The method according to claim 1 wherein in step D) the value by which markings of marking step D) are offset with respect to markings of step A) corresponds to the difference between the actual and desired values.

6. The method according to claim 1 wherein steps B)–D) are repeated until, by superimposition of the marking steps, all the differences between the actual and desired values lie inside prescribed tolerances.

7. The method according to claim 1 wherein the measurement of the actual positions of individual markings on the carrier is in reference to a single reference point.

8. The method according to claim 1 wherein for the purpose of measuring a change of sequential markings, an adjustment is carried out for a value or an absolute value of a specific physical variable.

9. The method according to claim 1 wherein for the purpose of measuring a change of sequential markings, positions of zero crossings of physical variables are determined.

10. The method according to claim 1 wherein the markings are magnetic poles.

11. The method according to claim 10 wherein a magnetic induction of the poles is located after each marking step in the region of the magnet saturation of the carrier material, and each region of the change from one marking to a following marking has a zero crossing of the magnetic induction.

12. The method according to claim 1 wherein measurement of an actual position involves a laser interferometer.

13. The method according to claim 1 wherein the marking step and the measuring step occur sequentially in one operation.

14. The method according to claim 1 wherein the carrier remains located in the same clamping device.

15. System for producing markings on a carrier comprising a marking device including a writing element for applying a track having a plurality of markings, a clamping device for arranging the carrier in the system, a positioning device which produces relative movement between the carrier and the writing element, a measuring device for determining actual positions of the markings or specific points of the markings, a means for storing the measured actual positions, a means for comparing the actual positions with prescribed desired positions of the markings or specific points of the markings and for determining the deviation between the actual and desired positions, and a controller for applying markings to the carrier anew above the track with markings, positions of these further markings being corrective in each case by a value which depends on the previously determined deviations.

16. The system according to claim 15 wherein the marking device has a magnetic writing head, the measuring device has a magnetic reading head, and means are present for the polarity reversal of the wiring head, it being possible to undertake the polarity reversal with the controller with the aid of the values depending on the deviations.

17. In a length measuring system of a linear motion guide wherein the improvement comprises a system according to claim 15 to produce markings relating to length.

* * * * *